(12) United States Patent
Farrar et al.

(10) Patent No.: US 10,724,387 B2
(45) Date of Patent: Jul. 28, 2020

(54) CONTINUATION OF A SHEAR TUBE THROUGH A VANE PLATFORM FOR STRUCTURAL SUPPORT

(71) Applicant: UNITED TECHNOLOGIES CORPORATION, Farmington, CT (US)

(72) Inventors: Bryan H. Farrar, West Hartford, CT (US); Howard J. Liles, Wethersfield, CT (US); Michael G McCaffrey, Windsor, CT (US); Andrew J. Lazur, Laguna Beach, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 52 days.

(21) Appl. No.: 16/184,701

(22) Filed: Nov. 8, 2018

(65) Prior Publication Data

US 2020/0149423 A1 May 14, 2020

(51) Int. Cl.
| | | |
|---|---|---|
| *F01D 5/14* | (2006.01) | |
| *F01D 9/04* | (2006.01) | |
| *F01D 5/28* | (2006.01) | |
| *B29C 70/24* | (2006.01) | |
| *B29L 31/08* | (2006.01) | |

(52) U.S. Cl.
CPC ............ *F01D 9/041* (2013.01); *B29C 70/24* (2013.01); *F01D 5/147* (2013.01); *F01D 5/282* (2013.01); *B29L 2031/082* (2013.01); *F05D 2230/60* (2013.01); *F05D 2240/12* (2013.01); *F05D 2240/80* (2013.01); *F05D 2300/6033* (2013.01); *F05D 2300/6034* (2013.01)

(58) Field of Classification Search
None
See application file for complete search history.

(56) References Cited

U.S. PATENT DOCUMENTS

| | | | | |
|---|---|---|---|---|
| 4,249,291 A | * | 2/1981 | Grondahl | F01D 5/185 29/889.722 |
| 4,314,794 A | * | 2/1982 | Holden | F01D 5/182 416/225 |
| 4,563,125 A | * | 1/1986 | Boudigues | F01D 5/18 415/115 |
| 6,514,046 B1 | * | 2/2003 | Morrison | F01D 9/02 416/229 A |
| 6,676,373 B2 | | 1/2004 | Marlin et al. | |

(Continued)

FOREIGN PATENT DOCUMENTS

EP 2562360 2/2013

OTHER PUBLICATIONS

European Patent Office, European Search Report dated Feb. 4, 2020 in Application No. 19207261.9.

*Primary Examiner* — Michael Lebentritt
(74) *Attorney, Agent, or Firm* — Snell & Wilmer, L.L.P.

(57) ABSTRACT

A stator vane may comprise an airfoil extending between a first platform and a second platform, a first shear tube may extend through the airfoil and relatively orthogonal to the first platform and the second platform, wherein the first shear tube extends through the first platform and the second platform. In various embodiments, a second shear tube may extend through the airfoil into the first platform and the second platform parallel the first shear tube.

18 Claims, 8 Drawing Sheets

(56) References Cited

U.S. PATENT DOCUMENTS

| | | | |
|---|---|---|---|
| 7,410,342 B2* | 8/2008 | Matheny | F01D 5/147 29/419.1 |
| 8,100,653 B2* | 1/2012 | Gerakis | F01D 5/147 416/97 R |
| 8,734,605 B2 | 5/2014 | Harrison | |
| 10,094,239 B2* | 10/2018 | Freeman | F01D 25/005 |
| 10,107,119 B2* | 10/2018 | Walston | F01D 9/041 |
| 10,408,084 B2* | 9/2019 | Thomas | F01D 9/065 |
| 10,415,428 B2* | 9/2019 | Spangler | F01D 25/12 |
| 10,436,049 B2* | 10/2019 | Propheter-Hinckley | F01D 5/282 |
| 2002/0076541 A1* | 6/2002 | Jarmon | C04B 35/806 428/312.6 |
| 2010/0129196 A1* | 5/2010 | Johnston | F01D 5/188 415/115 |
| 2011/0027098 A1 | 2/2011 | Noe et al. | |
| 2012/0055609 A1 | 3/2012 | Blanchard et al. | |
| 2012/0301313 A1* | 11/2012 | Suciu | F01D 5/282 416/230 |
| 2012/0301315 A1* | 11/2012 | Alvanos | F01D 11/001 416/230 |
| 2013/0142660 A1* | 6/2013 | McCaffrey | F01D 5/284 416/241 B |
| 2013/0189110 A1* | 7/2013 | Batt | F01D 9/041 416/219 R |
| 2013/0039769 A1 | 9/2013 | Kleinow | |
| 2013/0251939 A1 | 9/2013 | Kleinow | |
| 2014/0010662 A1 | 1/2014 | Duelm et al. | |
| 2014/0079895 A1 | 3/2014 | Foster et al. | |
| 2014/0255178 A1 | 9/2014 | Oudin et al. | |
| 2014/0356151 A1 | 12/2014 | Fremont et al. | |
| 2015/0040396 A1* | 2/2015 | Fremont | B29B 11/16 29/889.71 |
| 2015/0192027 A1 | 7/2015 | Paige et al. | |
| 2015/0226085 A1* | 8/2015 | Spangler | F01D 25/12 60/806 |
| 2016/0167112 A1* | 6/2016 | Carr | F01D 5/18 415/115 |
| 2016/0167269 A1* | 6/2016 | Pautard | B29C 45/14008 264/259 |
| 2016/0177743 A1 | 6/2016 | Thomas et al. | |
| 2016/0186583 A1* | 6/2016 | Alvanos | F01D 5/3007 416/219 R |
| 2016/0251969 A1* | 9/2016 | Boeke | F01D 5/189 415/115 |
| 2016/0258320 A1 | 9/2016 | Thomas et al. | |
| 2017/0009593 A1* | 1/2017 | Watanabe | C04B 35/80 |
| 2017/0074110 A1* | 3/2017 | Fremont | F01D 9/042 |
| 2018/0065337 A1* | 3/2018 | Grasso | B32B 15/02 |
| 2018/0119549 A1 | 5/2018 | Blanchard et al. | |
| 2018/0230823 A1 | 8/2018 | Sippel et al. | |
| 2019/0084890 A1* | 3/2019 | Weaver | C04B 35/806 |
| 2019/0368363 A1* | 12/2019 | Walston | F01D 25/005 |

\* cited by examiner

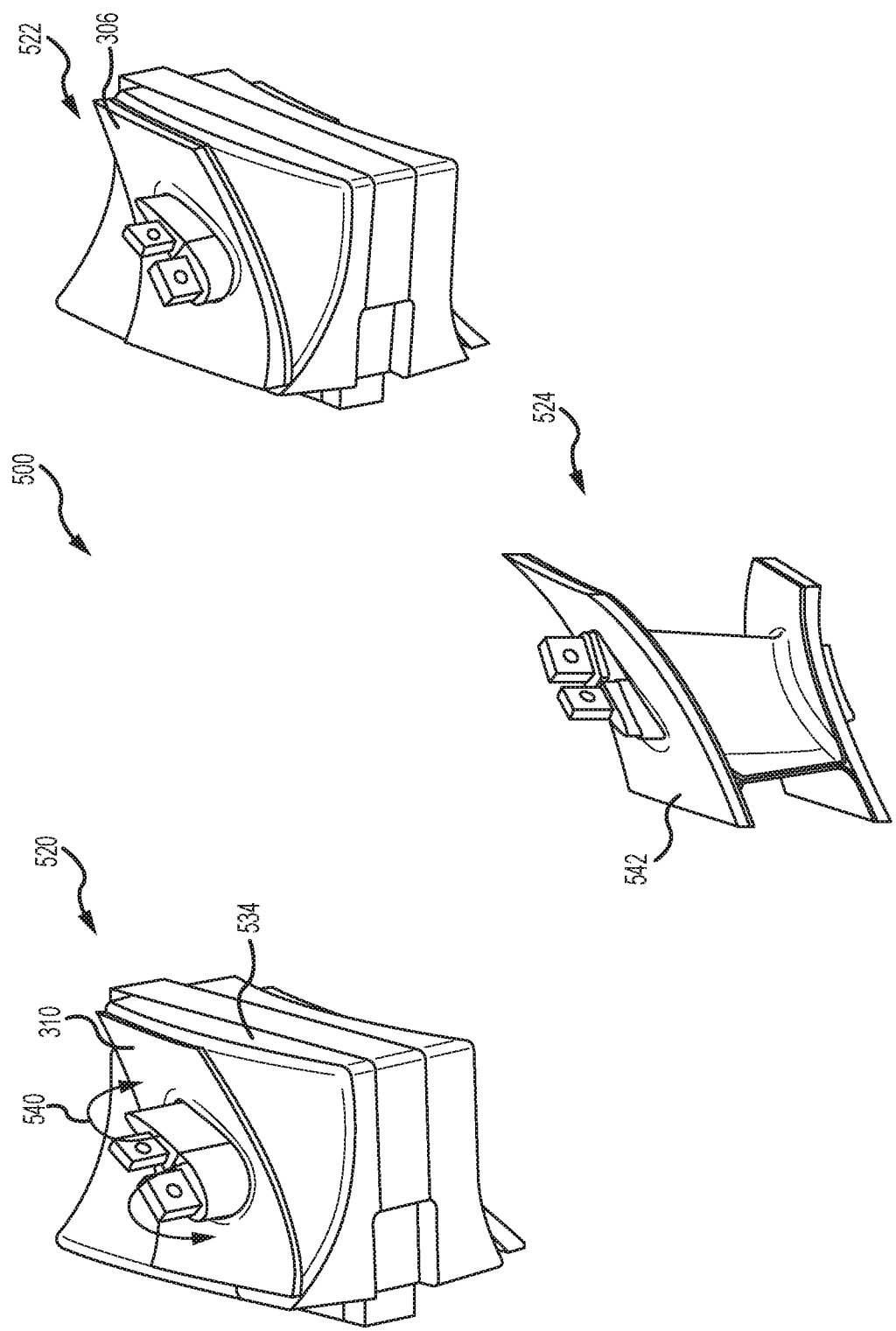

CONTINUATION OF A SHEAR TUBE THROUGH A VANE PLATFORM FOR STRUCTURAL SUPPORT

FIELD

The disclosure relates generally to stator vanes in gas turbine engines and more particularly to ceramic matrix composite vanes.

BACKGROUND

Interlaminar properties of ceramic matrix composite (CMC) stator vanes tend to have low relative strength compared to in plane load paths.

SUMMARY

In various embodiments the present disclosure provides a stator vane, comprising an airfoil extending between a first platform and a second platform, the airfoil including a first shear tube extending relatively orthogonal to the first platform and the second platform, wherein the first shear tube extends through the first platform and the second platform.

In various embodiments, a second shear tube extends through the airfoil into the first platform and the second platform parallel the first shear tube. In various embodiments, the first shear tube defines a core of the airfoil. In various embodiments, the first shear tube comprises a first shear tube layer and a second shear tube layer. In various embodiments, at least one of the first shear tube layer or the second shear tube layer is a triaxially braided layer. In various embodiments, a plurality of axial fibers of the triaxially braided layer are oriented radially. In various embodiments, at least one of the first platform or the second platform comprises a plurality of platform layers, wherein a bending and in plane shear force is induced in the plurality of fibers of the triaxially braided layer in response to an aerodynamic shear force transmitted through the plurality of platform layers. In various embodiments, the first platform comprises an inner gas path layer defining an inner gas path surface and wherein the second platform comprises an outer gas path layer defining an outer gas path surface. In various embodiments, the airfoil comprises an aerodynamic layer, wherein a first platform end is feathered over the inner gas path layer and a second platform end is feathered over the outer gas path layer.

In various embodiments, the present disclosure provides a gas turbine engine comprising a compressor section configured to compress a gas, a combustor section aft of the compressor section and configured to combust the gas, and a stator vane comprising an airfoil extending between a first platform and a second platform, the airfoil including a first shear tube extending relatively orthogonal to the first platform and the second platform, wherein the first shear tube extends through the first platform and the second platform.

In various embodiments, a second shear tube extends through the airfoil into the first platform and the second platform parallel the first shear tube. In various embodiments, the first shear tube defines a core of the airfoil. In various embodiments, the first shear tube comprises a first shear tube layer and a second shear tube layer. In various embodiments, at least one of the first shear tube layer or the second shear tube layer is a triaxially braided layer. In various embodiments, a plurality of axial fibers of the triaxially braided layer are oriented radially. In various embodiments, at least one of the first platform or the second platform comprises a plurality of platform layers, wherein a bending and in plane shear force is induced in the plurality of fibers of the triaxially braided layer in response to an aerodynamic shear force transmitted through the plurality of platform layers. In various embodiments, the first platform comprises an inner gas path layer defining an inner gas path surface and wherein the second platform comprises an outer gas path layer defining an outer gas path surface. In various embodiments, the airfoil comprises an aerodynamic layer, wherein a first platform end is feathered over the inner gas path layer and a second platform end is feathered over the outer gas path layer.

In various embodiments, the present disclosure provides a method of manufacturing a stator vane having a shear tube, the method comprising braiding a shear tube layer about a mandrel to form a first shear tube, applying an overbraid layer to the first shear tube to form an overbraided shear tube, wrapping the overbraided shear tube with a woven overlay to form an airfoil overlay, applying a consolidation tool to the airfoil overlay to form a consolidated airfoil overlay and wrapping the consolidated airfoil overlay with an aerodynamic layer to form a layered airfoil, applying the consolidation tool to the layered airfoil to consolidate the aerodynamic layer and the woven overlay to form an airfoil, disposing a gas path layer over the consolidation tool relatively perpendicular the airfoil and feathering an airfoil layer over the gas path layer to expose the first shear tube, and layering a plurality of platform plies over the airfoil layer and the gas path layer relatively perpendicular to the exposed first shear tube to form a first platform and a second platform. The method may further comprise joining a second shear tube with the first shear tube to form a core configuration and wrapping the core configuration with the overbraid layer to form the overbraided shear tube.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5C illustrates a method of manufacturing a stator vane having a shear tube, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
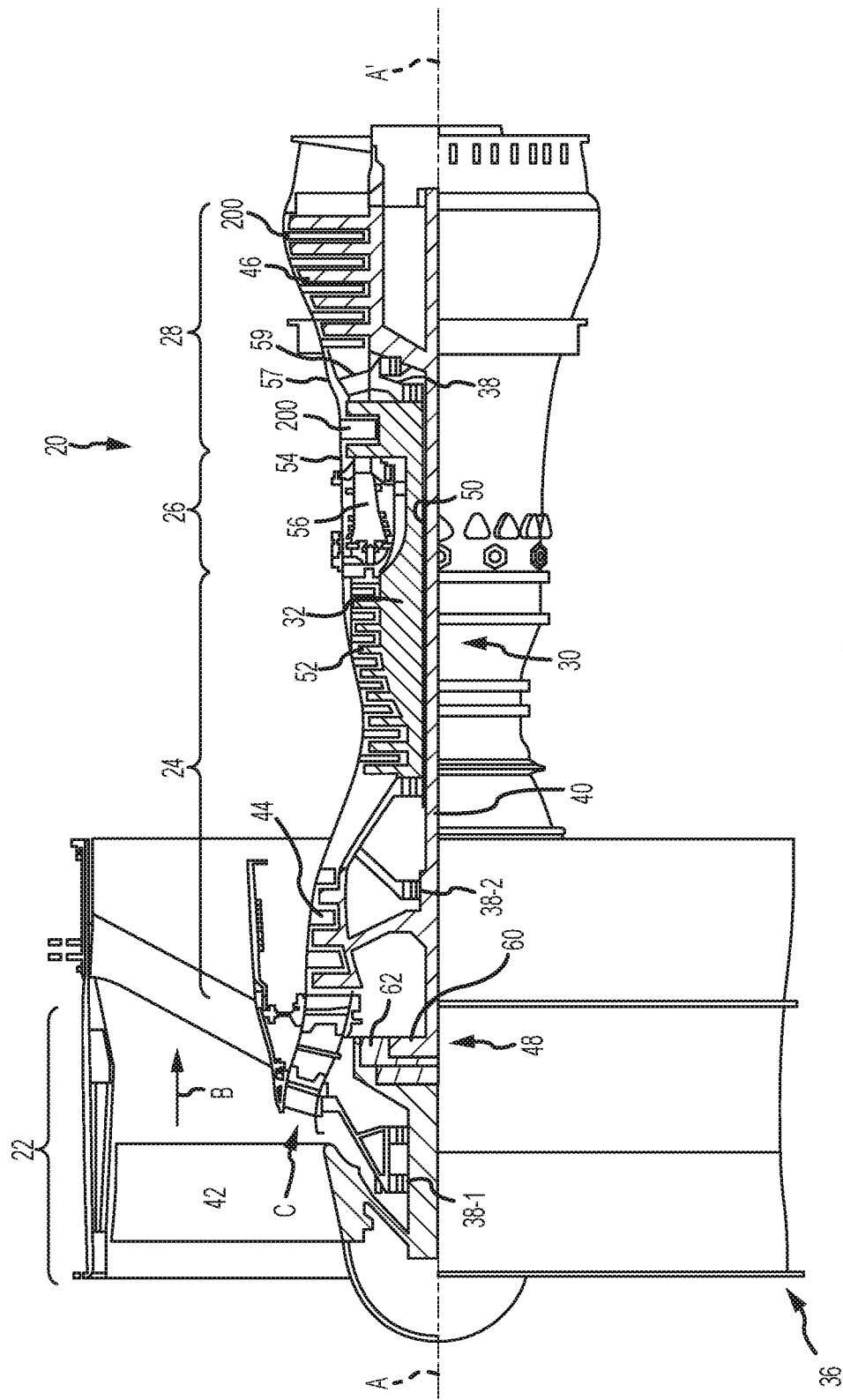
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
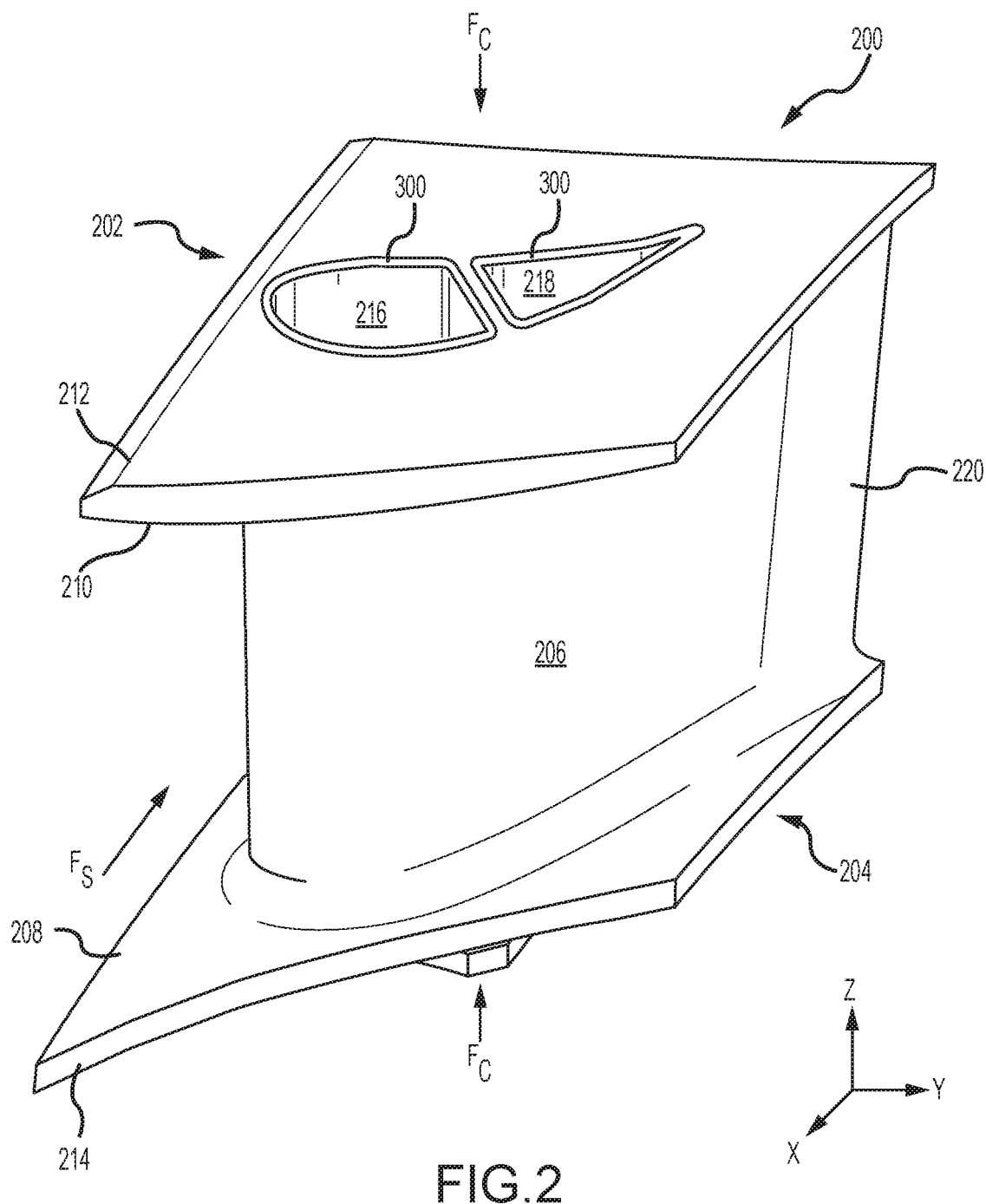
FIG. 2 illustrates a stator vane having a shear tube, in accordance with various embodiments.

According to various embodiments and with reference to FIGS. 1 and 2, a stator vane 200 having a shear tube is illustrated with XYZ-axes provided for reference. Stator vane 200 comprises an airfoil 206 extending between an inner gas path surface 208 of a first platform 204 (i.e. an inner platform) and an outer gas path surface 210 of a second platform 202 (i.e. an outer platform). The first platform 204 is defined between the inner gas path surface 208 and inner platform surface 214 and, in like regard, the second platform 202 is defined between the outer gas path surface 210 and the outer platform surface 212. In various embodiments, one or more cores such as first core 216 and second core 218 may extend radially (along the Z-axis) through the airfoil 206. The cores 216 and 218 may open through outer platform surface 212 of second platform 202 and inner platform surface 214 of first platform 204. In this regard, the inner platform surface 214 and the outer platform surface 212 may be in fluid communication through the first core 216 and second core 218. During gas turbine engine 20 operation, stator vane 200 may experience compressive loading force $F_c$ in the radial direction (along the Z-axis) and may also experience aerodynamic shear loading $F_s$ in the XY-plane.

Figure 3A:
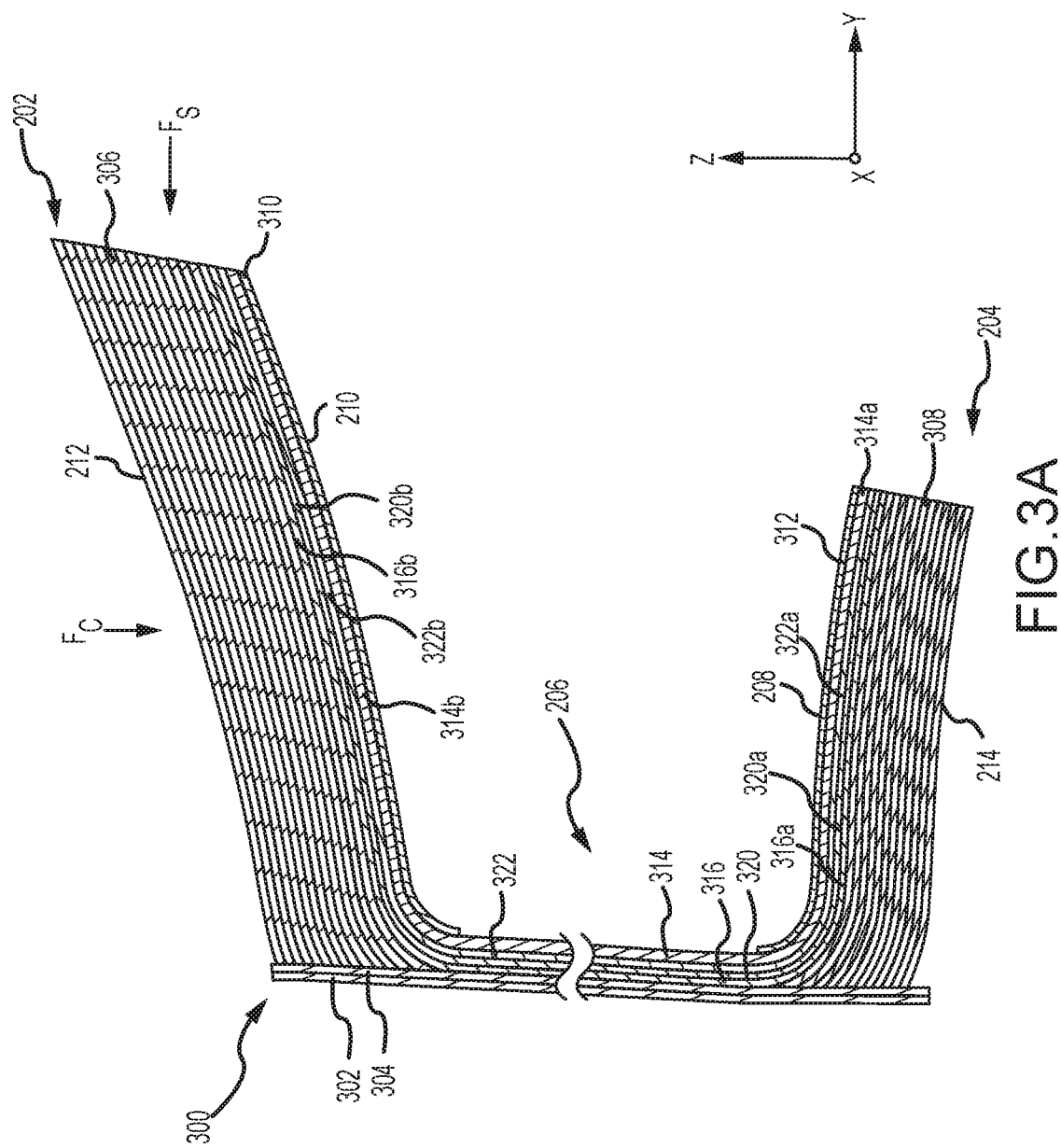
FIG. 3A illustrates a cross section of an stator vane having a shear tube, in accordance with various embodiments.
Figure 3B:
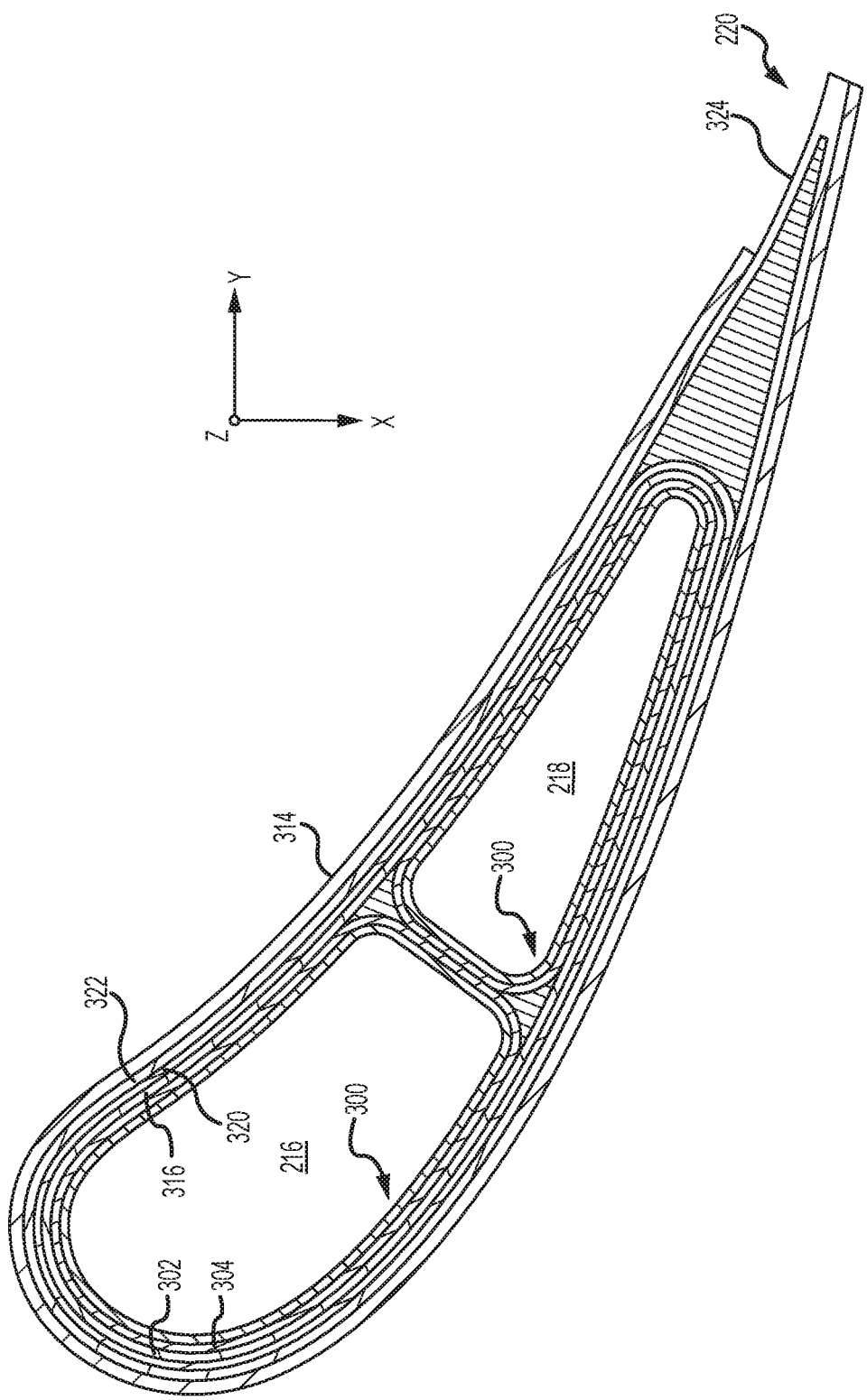
FIG. 3B illustrates a cross section of an airfoil having a shear tube, in accordance with various embodiments

In various embodiments and with additional reference to FIGS. 3A and 3B, stator vane 200 comprises a plurality of stacked, layered, and/or wrapped matrix plies and/or weaves. Stator vane 200 may be a Ceramic Matrix Composite (CMC) material such as, for example, one of a silicon-carbide/silicon-carbide matrix, carbon/carbon matrix, carbon/silicon-carbide matrix, alumina matrix, mullite matrix, or a zirconium boride matrix. FIG. 3A illustrates stator vane 200 in partial cross section through the ZY plane viewed along the X-axis. FIG. 3B illustrates a cross section of airfoil 206 of stator vane 200 through the XY plane viewed along the Z-axis. First platform 204 comprises a first plurality of platform plies 308 layered relatively coplanar with the XY plane and stacked (along the Z-axis). In a like manner, the second platform 202 comprises a second plurality of platform plies 306 layered relatively coplanar with the XY plane and stacked (along the Z-axis). The platform plies 306 and 308 may tend to be relatively resistant to compressive loading $F_c$ but, in response to shear loading $F_s$ applied relatively in plane to the platform plies 306 and 308, may tend to delaminate.

Airfoil 206 may be built up around one or more shear tubes 300 which may define the circumference of the first core 216 and the second core 218. Shear tubes 300 may comprise one or more shear tube layers such as first shear tube layer 302 and second shear tube layer 304 which wrap around the Z-axis and extend along the Z-axis through the airfoil 206, the first platform 204 and the second platform 202. Stated another way, the shear tubes 300 are disposed relatively orthogonally (i.e. within 45°) to the first plurality of platform plies 308 and the second plurality of platform plies 306. In this regard, the shear tubes 300 may be relatively orthogonal to the first platform 204 and the second platform 202 and tend to resist aerodynamic shear force $F_s$ tending thereby to inhibit delamination of the first plurality of platform plies 308 and the second plurality of platform plies 306. In various embodiments, a shear tube 300 may be wrapped, braided, and/or a triaxially braided shear tube.

Airfoil 206 may further include one or more overbraid layers which wrap around the Z-axis about the shear tubes 300 such as first overbraid layer 316 and second overbraid layer 320. In various embodiments, the overbraid layers may be a continuous overbraid (e.g., a tube) with first platform ends (316a, 320a) and second platform ends (316b, 320b) feathered out and laid relatively in plane with the first the first plurality of platform plies 308 and the second plurality of platform plies 306 thereby forming a portion of the respective platform. In like regard, airfoil 206 may include a woven overlay 322 (e.g., a Y-weave overlay) about the overbraid layers with ends (322a, 322b) of the woven overlay 322 similarly feathered and laid relatively in plane with the first plurality of platform plies 308 and the second plurality of platform plies 306 and proximate first platform ends (316a, 320a) and second platform ends (316b, 320b).

An aerodynamic layer 314 wraps over the woven overlay 322 forming the aerodynamic surface of airfoil 206 with ends (314a, 314b) similarly feathered and laid relatively in plane with the first plurality of platform plies 308 and the second plurality of platform plies 306 and respectively contacting the ends (322a, 322b) of the woven overlay 322. In various embodiments, aerodynamic layer 314 may not fully overwrap the woven overlay 322 and may expose a portion 324 of the woven overlay 322 proximate the trailing edge 220 of airfoil 206. In various embodiments an inner gas path layer 312 may be layered over first platform end 314a of aerodynamic layer 314 and define the inner gas path surface 208. In like regard, an outer gas path layer 310 may be layered over the second platform end 314b of aerodynamic layer 314 and define the outer gas path surface 210. In this regard, airfoil 206 may be built up of multiple layers and a shear tube such as shear tube 300 may comprise any layer or any number of layers of an airfoil such as airfoil 206.

Figure 4:
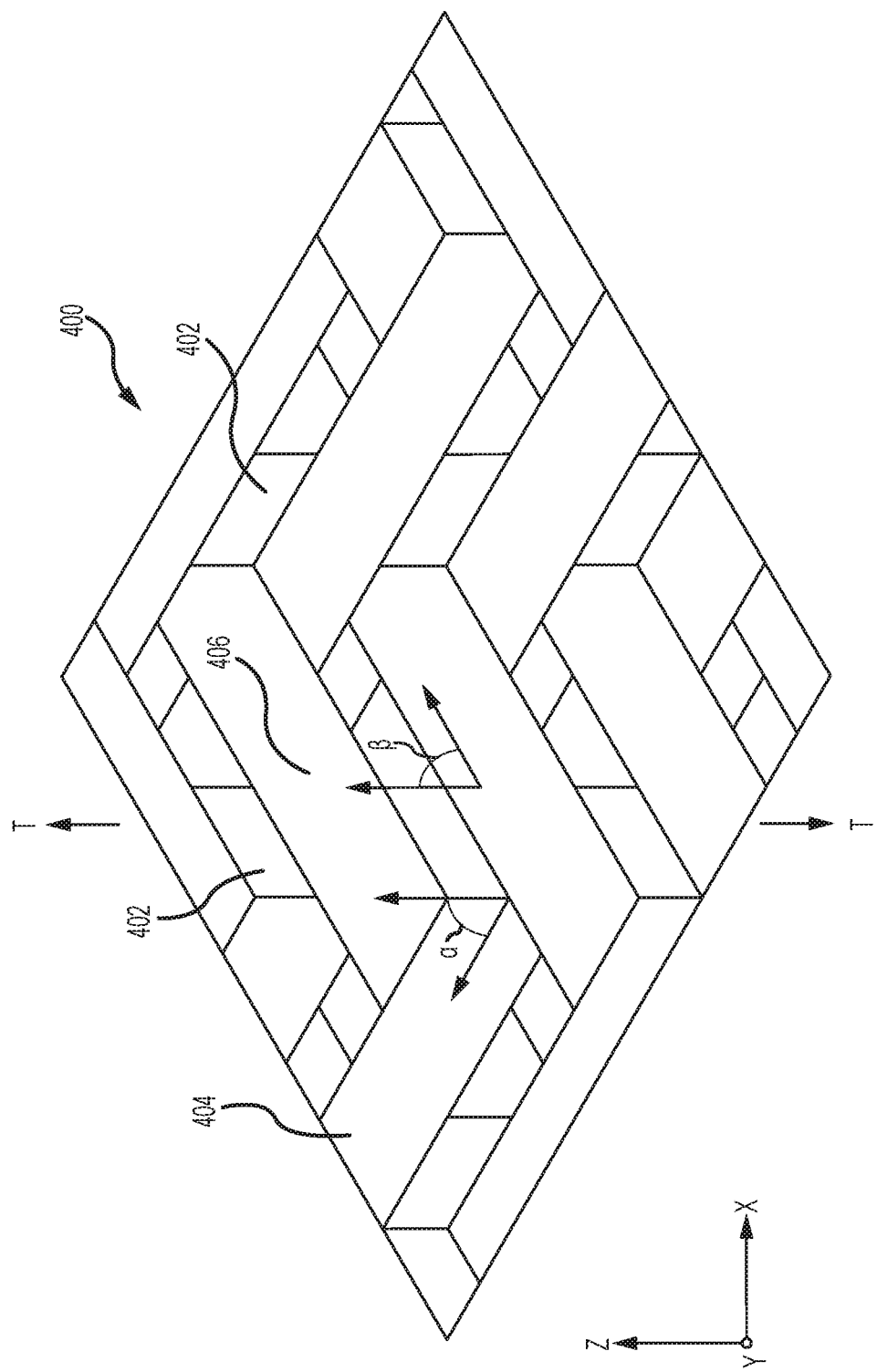
FIG. 4 illustrates a section of triaxially braided layer, in accordance with various embodiments.

With additional reference to FIG. 4, a section 400 of a triaxially braided layer is illustrated in accordance with various embodiments showing details of the braided fibers. Section 400 includes a plurality of axial fibers 402 which are wrapped relatively between first bias fibers 404 and second bias fibers 406. The intersection between the first bias fibers 404 and the axial fibers 402 define a first bias angle α and, in like regard, the intersection between the second bias fibers 406 and the axial fibers 402 define a second bias angle β. The first bias angle and the second bias angle may be configured to improve the material properties of a layer. In various embodiments, bias angle α and bias angle β may be equal. In various embodiments bias angle α may be between 20° and 70° and bias angle β may be between 20° and 70°.

In various embodiments, the first shear tube layer 302 and the second shear tube layer 304 may comprise triaxially braided layers having the axial fibers 402 oriented radially (parallel the Z-axis). In this regard shear tube 300 may be a triaxially braided shear tube. In various embodiments, first overbraid layer 316 and second overbraid layer 320 may comprise triaxially braided layers having the axial fibers 402 oriented axially (parallel the X-axis). In this regard, aerodynamic shear force $F_s$ may be transferred compressively through the layers of airfoil 206, first platform 204 and second platform 202 and, in response, tending to induce a bending and in plane shear force T in fibers (402, 404, 406) of the triaxially braided shear tubes 300 which tends to resist the transmitted aerodynamic shear force $F_s$. In this regard, a closed section of shear tubes 300 tends to increase its shear loading capacity thereby tending to enhance the overall shear strength of vane 200.

Figure 5A:
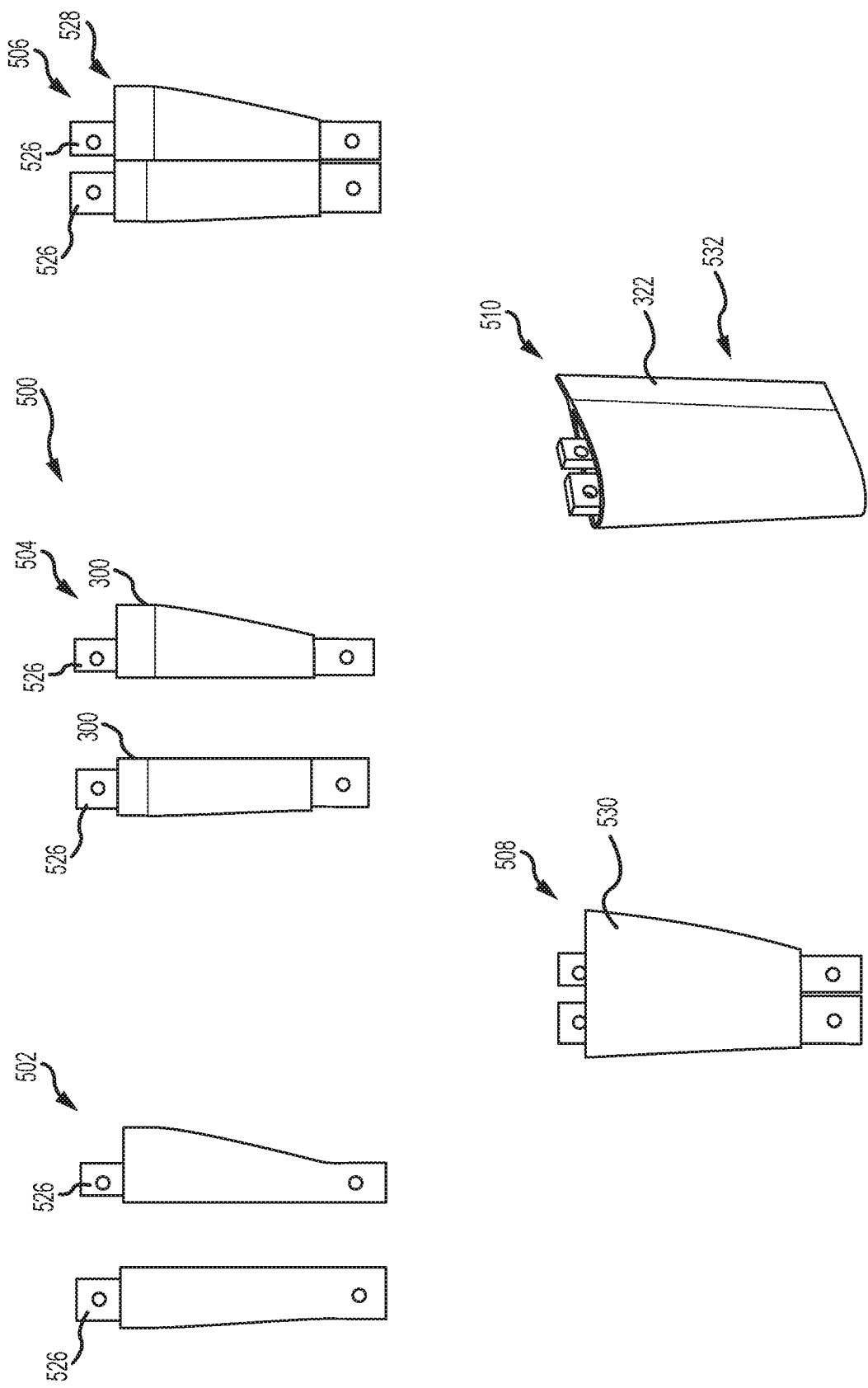
FIG. 5A illustrates a method of manufacturing a stator vane having a shear tube, in accordance with various embodiments.
Figure 5B:
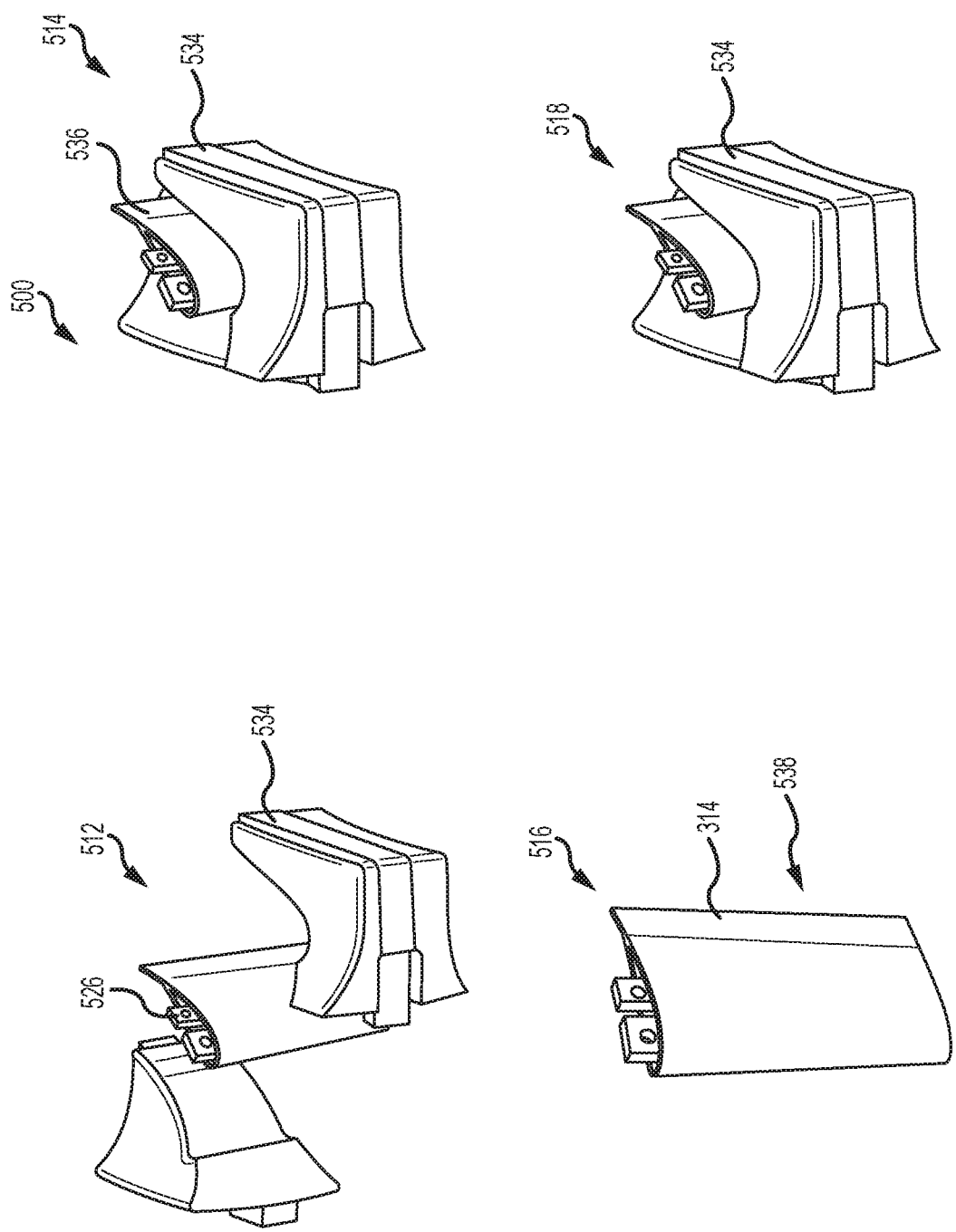
FIG. 5B illustrates a method of manufacturing a stator vane having a shear tube, in accordance with various embodiments.

With additional reference to FIGS. 5A, 5B, and 5C a method 500 of manufacturing a stator vane having a shear tube is illustrated in accordance with various embodiments. Method 500 includes selecting one or more core mandrels 526 to define a core such as first core 216 and second core 218 of vane 200 (step 502). Each of the selected mandrels 526 are braided with a shear tube layer to form a shear tube (step 504). For example, mandrels 526 may be braided with first shear tube layer 302 and second shear tube layer 304 to form shear tubes 300. Method 500 includes joining the shear tubes 300 on the mandrels 526 to form a core configuration 528 (step 506). In various embodiments, step 506 includes coupling the shear tubes 300 with a filler material such as, for example, individual fibers, bundles of fibers, chopped fiber, monolithic ceramic material, layered fabric material, pre-densified composites and/or the like. Method 500 includes wrapping the core configuration 528 with an overbraid layer to form an overbraided shear tube 530 (step 508). For example shear tubes 300 may be wrapped with first overbraid layer 316 and second overbraid layer 320. Method 500 includes wrapping overbraided shear tube 530 with woven overlay 322 and may include adding the filler material to form an airfoil overlay 532 (step 510).

In various embodiments, method 500 includes mounting mandrels 526 and airfoil overlay 532 in an a consolidation fixture (step 512) and applying a consolidation tool 534 to the airfoil overlay to form a consolidated airfoil overlay 536 (step 514). Method 500 includes removing consolidation tool 534 and wrapping consolidated airfoil overlay 536 with aerodynamic layer 314 to form layered airfoil 538 (step 516). Step 516 may include leaving an exposed portion 324 of woven overlay 322 proximate trailing edge 220. Method 500 includes applying consolidation tool 534 to layered airfoil 538 to consolidate the woven overlay 322 and the aerodynamic layer 314 to form airfoil 206 (step 518). Method 500 includes layering a gas path layer such as, inner gas path layer 312 and outer gas path layer 310, over the consolidation tool 534 relatively perpendicular (i.e. within 45°) the airfoil 206, feathering an airfoil layer over the gas path layer, and exposing a portion of the shear tubes 300 (step 520). Step 520 includes feathering ends of the aerodynamic layer, the overlay layer, and overwrap layers and folding (arrows 540) the feathered ends of respective aerodynamic, overlay, and overwrap layers over the respective gas path layer. For example, step 520 may include folding second platform end 314b of aerodynamic layer 314 over outer gas path layer 310, and folding second platform end 322b of woven overlay 322 over second platform end 314b, and folding second platform ends 320b and 316b of second overbraid layer 320 and first overbraid layer 316 over second platform end 322b, thereby exposing second shear tube layer 304 of shear tube 300.

Method 500 includes layering a plurality of platform layers over the airfoil layers and perpendicular to the exposed shear tube to form the first platform 204 and the second platform 202 (step 522). For example, step 522 includes layering the second plurality of platform plies 306 over second platform end 316b of first overbraid layer 316 around the second shear tube layer 304 of shear tube 300. In various embodiments, step 522 may include feathering and folding the ends of the shear tube layers over the plurality of platform plies. Method 500 includes consolidating the first platform 204, the second platform 202, and the airfoil 206 to form vane preform 542 (step 524). Step 524 may include curing the vane preform. Method 500 includes performing one of chemical vapor infiltration, melt infiltration, polymer infiltration, pyrolysis, or sintering on vane preform 542 to form stator vane 200.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator vane, comprising:
   an airfoil extending between a first platform and a second platform,
   the airfoil including a first shear tube extending relatively orthogonal to the first platform and the second platform,
   wherein the first shear tube extends through the first platform and the second platform; and
   wherein the first shear tube defines a hollow core of the airfoil.

2. The stator vane of claim 1, further comprising a second shear tube extending through the airfoil into the first platform and the second platform parallel the first shear tube.

3. The stator vane of claim 1, wherein the first shear tube comprises a first shear tube layer and a second shear tube layer.

4. The stator vane of claim 3, wherein at least one of the first shear tube layer or the second shear tube layer is a triaxially braided layer.

5. The stator vane of claim 4, wherein a plurality of axial fibers of the triaxially braided layer are oriented radially.

6. The stator vane of claim 5, wherein at least one of the first platform or the second platform comprises a plurality of platform layers,
   wherein a bending and in plane shear force is induced in the plurality of fibers of the triaxially braided layer in response to an aerodynamic shear force transmitted through the plurality of platform layers.

7. The stator vane of claim 1, wherein the first platform comprises an inner gas path layer defining an inner gas path surface and wherein the second platform comprises an outer gas path layer defining an outer gas path surface.

8. The stator vane of claim 7, wherein the airfoil comprises an aerodynamic layer, wherein a first platform end is feathered over the inner gas path layer and a second platform end is feathered over the outer gas path layer.

9. A gas turbine engine comprising:
   a compressor section configured to compress a gas;
   a combustor section aft of the compressor section and configured to combust the gas;
   and a stator vane comprising:
   an airfoil extending between a first platform and a second platform,
   the airfoil including a first shear tube extending relatively orthogonal to the first platform and the second platform,
   wherein the first shear tube extends through the first platform and the second platform; and
   wherein the first shear tube defines a hollow core of the airfoil.

10. The gas turbine engine of claim 9, further comprising a second shear tube extending through the airfoil into the first platform and the second platform parallel the first shear tube.

11. The gas turbine engine of claim 9, wherein the first shear tube comprises a first shear tube layer and a second shear tube layer.

12. The gas turbine engine of claim 11, wherein at least one of the first shear tube layer or the second shear tube layer is a triaxially braided layer.

13. The gas turbine engine of claim 12, wherein a plurality of axial fibers of the triaxially braided layer are oriented radially.

14. The gas turbine engine of claim 13, wherein at least one of the first platform or the second platform comprises a plurality of platform layers,
   wherein a bending and in plane shear force is induced in the plurality of fibers of the triaxially braided layer in response to an aerodynamic shear force transmitted through the plurality of platform layers.

15. The gas turbine engine of claim 9, wherein the first platform comprises an inner gas path layer defining an inner gas path surface and wherein the second platform comprises an outer gas path layer defining an outer gas path surface.

16. The gas turbine engine of claim 15, wherein the airfoil comprises an aerodynamic layer, wherein a first platform end is feathered over the inner gas path layer and a second platform end is feathered over the outer gas path layer.

17. A method of manufacturing a stator vane having a first shear tube, the method comprising:
   braiding a shear tube layer about a mandrel to form the first shear tube;
   applying an overbraid layer to the first shear tube to form an overbraided shear tube;
   wrapping the overbraided shear tube with a woven overlay to form an airfoil overlay;
   applying a consolidation tool to the airfoil overlay to form a consolidated airfoil overlay and wrapping the consolidated airfoil overlay with an aerodynamic layer to form a layered airfoil;
   applying the consolidation tool to the layered airfoil to consolidate the aerodynamic layer and the woven overlay to form an airfoil;
   disposing a gas path layer over the consolidation tool relatively perpendicular the airfoil and feathering an airfoil layer over the gas path layer to expose a portion of the first shear tube; and
   layering a plurality of platform plies over the airfoil layer and the gas path layer relatively perpendicular to the exposed portion of the first shear tube to form a first platform and a second platform;
   wherein the first shear tube defines a hollow core of the airfoil.

18. The method of claim 17 further comprising, joining a second shear tube with the first shear tube to form a core configuration and wrapping the core configuration with the overbraid layer to form the overbraided shear tube.

* * * * *